United States Patent [19]

Schollenberger et al.

[11] 4,255,552
[45] Mar. 10, 1981

[54] THERMOSETTING POLYURETHANE COMPOSITIONS

[75] Inventors: Charles S. Schollenberger, Hudson; Kornelius Dinbergs, Broadview Heights, both of Ohio

[73] Assignee: The B. F. Goodrich Company, Akron, Ohio

[21] Appl. No.: 81,430

[22] Filed: Oct. 3, 1979

[51] Int. Cl.³ ............................................. C08G 18/32
[52] U.S. Cl. ...................................................... 528/50
[58] Field of Search .......................................... 528/50

[56] References Cited

U.S. PATENT DOCUMENTS

| | | | |
|---|---|---|---|
| 3,211,700 | 10/1965 | Weisfeld | 528/50 |
| 3,230,199 | 1/1966 | Muhlhausen et al. | 528/50 |
| 3,577,389 | 5/1971 | Kuhar | 528/50 |
| 3,644,569 | 2/1972 | Pietsch et al. | 528/50 |

*Primary Examiner*—Maurice J. Welsh
*Attorney, Agent, or Firm*—J. Hughes Powell, Jr.

[57] ABSTRACT

Improved thermoset or vulcanized polyurethane elastomers are obtained by adding to liquid polyurethane reactants, prior to reaction to form the polyurethane, organic peroxides having a half-life value of greater than one hour at 100° C. Such mixtures may be heated to form the polyurethane article and thereafter thermoset or vulcanized, or the polyurethane containing the unactivated peroxide may be provided in sheet, crumbs, granules or otherwise and then formed and heated to thermoset or vulcanize the polyurethane.

15 Claims, No Drawings

THERMOSETTING POLYURETHANE COMPOSITIONS

BACKGROUND OF THE INVENTION

Thermoplastic polyurethane materials have many uses as fabricated articles because of their physical properties and their ease of processing. However, as thermoplastic materials, their use at high temperatures is often precluded or limited, they have a tendency to permanent set, and may be adversely affected by certain solvents. Stable polyurethane elastomeric compositions that can be vulcanized by free radical curing agents included during or after processing would be of value in that the disadvantages mentioned above would be at least partially offset.

SUMMARY OF THE INVENTION

Improved thermoset or vulcanized polyurethane elastomers are obtained by adding to liquid polyurethane reactants, prior to reaction to form the polyurethane, organic peroxides having a half-life value of greater than one hour at 100° C. Such mixtures may be heated to form the polyurethane article and thereafter thermoset or vulcanized, or the polyurethane containing the unactivated peroxide may be provided in sheet, crumbs, granules or otherwise and then formed and heated to thermoset or vulcanize the polyurethane.

Polyurethane elastomers that may be treated as thermoplastic materials during processing are provided in this invention for use by fabricators in a state of subdivision such as crumbs or granules, which allow easy fabrication into articles by conventional thermoplastic polymer processing operations, which on attainment of a predetermined temperature activates a peroxide curing agent sufficient to provide the desired degree of vulcanization or cross-linking in the fabricated part. Likewise, liquid polyurethane formulations are provided that may be cast into articles and cured at that time or later. In accordance with this invention, polyurethanes including polyesterurethanes, polylactoneurethanes, polyetherurethanes, polyhydrocarbonurethanes, and the like, containing predetermined amounts of free radical curing organic peroxides having a decomposition temperature greater than the temperature of formation of the polyurethane are prepared by dissolving the defined peroxide in liquid reactants as the molten macroglycol used to prepare the polyurethane. This technique offers a substantial advantage over conventional methods of adding curing or cross-linking agents by compounding the polyurethane just prior to forming into articles since the excessive heat often developed limits the peroxides that may be used as curing agents and may degrade the polymers.

DETAILED DESCRIPTION

The polyurethanes are readily prepared from a variety of compounds having terminal functional groups reactive with organic diisocyanates. Normally used are hydroxyl- or amine-terminated compounds having molecular weights greater than about 300 to 400. A great variety of such macroglycols and amines have been prepared and proposed for commercial applications. The most commonly used macroglycols are hydroxyl-terminated polyesters, polyethers, polyacetals, polylactones and polybutadienes. In the preparation of one type of elastomeric material such macroglycols, alone or in admixture, having molecular weights greater than about 400, and difunctional chain extenders as glycols, are reacted with the organic diisocyanate. Useful materials are obtained by reacting the organic diisocyanate with a mixture of a macroglycol and a small difunctional chain extender such as an alkylene glycol or ether glycol, a cycloaliphatic glycol, or an aromatic-aliphatic glycol; or the so-called prepolymer technique may be used where an excess or organic diisocyanate is first reacted with the macroglycol and then the small difunctional chain extender added, normally in amounts equivalent to react with substantially all of the free isocyanate groups.

The hydroxyl polyester macroglycols include linear hydroxyl-terminated polyesters having molecular weights between about 500 and 6000 and acid numbers usually less than about 10. The polyesters utilized include those prepared by the polyesterification of aliphatic dicarboxylic acids including for example, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC-R-COOH where R is an alkylene radical containing 1 to 10 carbon atoms. The phthalic acids are also useful. The glycols used in the preparation of the polyesters by reaction with the dicarboxylic acids are aliphatic glycols containing between 2 and 10 carbon atoms such as ethylene glycol, propanediol, butanediol, hexamethylene glycol, decamethylene glycol, 2-ethylhexanediol-1,6, neopentyl glycol and the like. Preparation of specific polyesterurethanes from polyesters are described in U.S. Pat. No. 2,871,218 for example. Polyesteramides also are contemplated, ususally by substitution of a diamine or amino alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX-R-XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4,hexamethylene glycol and the like. Ethylene glycol provides excellent polyesters.

The lactones preferred for preparing the polyesters are epsilon-caprolactones having the general formula

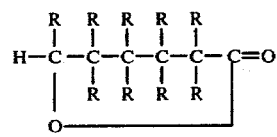

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, α-methyl-epsilon-caprolactone, β-methyl-epsiloncaprolactone, dimethyl-epsilon-caprolactone and the like. The lactones are polymerized readily by heating with the bifunctional reactant to a temperature of about 100° to about 200° C. Catalysts may be employed if desired. Particularly preferred are poly(epsilon-caprolactone) diols having molecular weights in the range of about 500 to about 5000.

The hydroxyl(polyalkylene oxide), or polyether macroglycols preferably are essentially linear hydroxylterminated compounds having ether linkages as the major linkage joining carbon atoms. The molecular weights may vary between about 500 and 4000. The hydroxyl(polyalkylene oxide)s found useful include hydroxyl poly(methylene oxide)s as hydroxyl poly(tetramethylene oxide), hydroxyl poly(trimethylene oxide), hydroxyl poly(hexamethylene oxide), hydroxyl poly(ethylene oxide) and the like of the formula $HO[(CH_2)_nO]_xH$ wherein n is a number from 2 to 6 and x is an integer, and alkyl substituted types such as hydroxyl poly(1,2-propylene oxide). Preparation of polyurethanes from these polyethers is described in U.S. Pat. No. 2,899,411 for example.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and the like reacted with glycols; for example, ethylene glycol, trimethylol propane, hexanediol, diethylene glycol, and the like which are well known to those skilled in the art. Generally, the polyacetals may be considered to be reaction products of aldehydes and glycols. The molecular weights of the polyacetal will be varied from about 500 to about 4000.

If small glycols are used as chain extenders with the macroglycols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol and the like. Cycloaliphatic glycols such as cyclohexanedimethanol, and aromaticaliphatic glycols such as bis-1,4(β-hydroxyethoxy) benzene, may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used. If amines are used, they generally will be hindered aromatic amines such as methylene-bis-2-chloroaniline and the like.

The organic diisocyanates which are reacted with the macroglycols or amines will include, for example, alicyclic, aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, dibenzyl diisocyanate, diphenyl ether diisocyanates, bitolylene diisocyanates and the like, for example diisocyanates of the formula

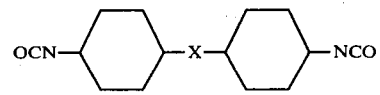

wherein X may be a valence bond, an alkylene radical containing 1 to 5 carbon atoms, NR where R is an alkyl radical, oxygen, sulfur, sulfoxide, sulfone and the like. Also useful are acyclic or alicyclic diisocyanates containing greater than 6 carbon atoms as 4,4'-methylene-bis-(cyclohexyl isocyanate).

About equimolar ratios of diisocyanate and/or amines or diols may be used. When a small glycol chain extender is also used, the ratio of reactants employed may be varied from about 1.5 to 13 mols of organic diisocyanate per mol of macroglycol with 0.5 to 12 mols of the glycol. The amount of organic diisocyanate used is dependent on the total amount of chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 800 to 2500, 1 to 3 mols glycol, and 2 to 4 mols of the aromatic diisocyanate are caused to react. While essentially equimolar amounts of isocyanate and active hydrogen groups are often preferred, it will be understood that an excess of any reactant, preferably less than 25%, as 6%, of excess organic diisocyanate can be used in forming prepolymers. These, of course, have to be kept free of moisture until further reaction with chain extender component is desired.

Typical organic peroxides that may be used, and their half life values, are set forth below. Typically the peroxides will have a half life value of about 1 hour at 100° C. or higher temperature. Typically peroxides include for example t-Butyl Peroxyisobutyrate, Benzoyl Peroxide, p-Chlorobenzoyl Peroxide, Hydroxyheptyl Peroxide, Cyclohexanone Peroxide, Di-t-Butyl Diperphthalate, t-Butyl Peracetate, t-butyl Perbenzoate, Dicumyl Peroxide, t-Butyl Hydroperoxide (commercial t-butyl hydroperoxide contains about 20% di-t-butyl peroxide), Methyl Ethyl Ketone, Di-t-butyl Peroxide, p-Menthane Hydroperoxide, Pinane Hydroperoxide, Cumene Hydroperoxide and 2,5-Dimethyl-2,5-Dihydroperoxide. Typical half-life values of 10 hours at 105° C. for these peroxides include for example, Di-t-Butyl Diperphthalate, 105°; t-Butyl Peracetate, 102°; t-butyl Perbenzoate, 105°; Dicumyl Peroxide, 117°; t-Butyl Hydroperoxide, 121°; Methyl Ethyl Ketone, 105°; Di-t-Butyl Peroxide, 126°; p-Menthane Hydroperoxide, 133°; Pinane Hydroperoxide, 141°; Cumene Hydroperoxide, 158°; and 2,5-Dimethyl-2,5-Dihydroperoxide, 154°.

The peroxides are added in amounts of at least about 0.1 weight percent based on the polyurethane, to amounts as large as is desired. Normally an excess is to be avoided and amounts as high as less than 5%, as 0.5 to 2 weight percent are satisfactory.

The peroxides are added to one or more liquid polyurethane reactants, preferably dissolved in the macroglycol or glycol if used or mixtures thereof.

EXAMPLE

One mol of water extracted poly(tetramethylene adipate) glycol, molecular weight 1197, was melted at 50°

C. and α,α'-bis(t-Butyl peroxy)diisopropyl benzene in varying amounts shown in the table below are dissolved in the melted polyester glycol. 0.8 mol of 1,4-butane diol was then added to this solution and the mixture heated to 60° C. 1.8 mols of diphenyl methane 4,4'-diisocyanate was melted at 70° C. and mixed into the polyester glycol solution and after mixing the mixture was poured into a mold and heated for four hours at 114° C. The resulting products were essentially clear elastomers and were soluble at 5% concentration in dimethylformamide at 25° C. Samples of these peroxide containing polyurethanes are molded at 169° C. to 180° C. in the form of 0.025×6×6" sheets to form them while decomposing the peroxide, and thus curing or cross-linking the polyurethane chains via covalent that is carbon to carbon bonds. The test data obtained is as follows:

TABLE I

| Experiment #7743-77 | Peroxide[a] (wt.%)[b] | Cure Conditions (Min. at °C.) | Behavior in DMF[d] at 25° C. | |
|---|---|---|---|---|
| | | | Before Cure | After Cure |
| 160 | 2.0 | 20' × 175° C. | soluble | insol. 166% sw |
| 161 | 1.0 | 8' × 185° C. | soluble | insol. 205% sw |
| 162 | 0.5 | 8' × 185° C. | soluble | insol. 275% sw |
| 163 | 0 | 5' × 160° C. | soluble | soluble |

[a] α, α'-bis(t-butylperoxy)diisopropyl benzene (Noury Chemical Co. Percodox 14)
[b] on polyurethane
[c] maximum (at 1½ minutes reaction time)
[d] stabilized (via n-propyl iodide)

In another embodiment a polyester glycol, the peroxy compound, butanediol and diisocyanate of the above example are mixed together and after casting into a mold heated at a temperature of about 200° C. to form a thermoset polyurethane that was insoluble in DMF and had elastomeric properties.

The foregoing results indicate that the peroxide was successfully and easily incorporated into the polyurethane as the latter formed by the urethane polymerization reaction, and was little if at all activated in the polyurethane forming step of the process. A family of products can be produced commercially and marketed, for example, to users who could fabricate them by solution, extrusion, injection molding, etc. techniques into useful articles which could be crosslinked during or subsequent to the fabrication operation; and by providing cured articles by after treatment of molded or formed articles as by heating, all to obtain the added advantages of solvent resistance, elevated service temperature, reduced permanent set, etc. in the polyurethanes of this invention. For as can be seen, the application of sufficient energy (here, thermal) to decompose, activate the peroxide in the polyurethane, effectively crosslinks the polyurethane. Likewise, the cure may be obtained by casting the liquid mixture and heating to form the polyurethane, and activate the peroxide to cross-link or vulcanize the polyurethane. Or the liquid may be cast, the polyurethane and article formed, and the green article later cured. Typical applications would be mixing all the liquid reactants including the peroxide, casting into a mold and forming a solidified polyurethane product which may be thereafter heated to activate the peroxide to obtain a cure either in the mold or in a separate step in an oven. Another typical application would be the formation of the solid polyurethane containing inactivated peroxide prepared as defined, which was then extruded as around wire to prepare coated wire, and the coated wire heated to cause the thermoset or cross-linking reaction. Another typical application would be to prepare the polyurethane in a solvent as dimethyl formamide, or first prepare polyurethane and then dissolve it in a solvent, cast a film from this solution and then heat or expose to ultraviolet light to cause the cross-linking reaction. This type of a process of course may be at a lower temperature and may use a less stable peroxide than those used in extrusion process, for example.

We claim:

1. A process for preparing cross-linkable peroxide containing polyurethanes comprising mixing together in a liquid state a hydroxyl or amine terminated compound having a molecular weight greater than 300 with an organic diisocyanate and an organic peroxide having a minimum half-life value of about 1 hour at 100° C. and heating the mixture to form a polyurethane elastomer.

2. A process of claim 1 wherein said compound is a hydroxyl terminated polyester, polyether, polylactone or polybutadiene having a molecular weight greater than about 400.

3. A process of claim 2 wherein the diisocyanate is alicyclic, aliphatic or aromatic diisocyanate present in amount to at least react with substantially all of the terminal hydroxyl groups of said compound.

4. A process of claim 2 wherein said organic peroxide is present in amount of at least 0.1 weight percent of the polyurethane.

5. A process of claim 4 wherein a hydroxyl terminated polyester or polyether are present along with an aliphatic diol containing 2 to 8 carbon atoms and an aromatic diisocyanate is present in amount to substantially react with at least about 90% of the hydroxyl groups.

6. A peroxide containing cross-linkable polyurethane prepared by the process of claim 1.

7. A peroxide containing cross-linkable polyurethane prepared by the process of claim 2.

8. A peroxide containing cross-linkable polyurethane prepared by the process of claim 3.

9. A peroxide containing cross-linkable polyurethane prepared by the process of claim 4.

10. A peroxide containing cross-linkable polyurethane prepared by the process of claim 5.

11. A crosslinked polyurethane obtained by heating the peroxide containing polyurethane of claim 6 to activate said peroxide to induce cross-linking to form a thermoset polyurethane.

12. A cross-linked polyurethane obtained by heating the peroxide containing polyurethane of claim 7 to activate said peroxide to induce cross-linking to form a thermoset polyurethane.

13. A cross-linked polyurethane obtained by heating the peroxide containing polyurethane of claim 8 to activate said peroxide to induce cross-linking to form a thermoset polyurethane.

14. A cross-linked polyurethane obtained by heating the peroxide containing polyurethane of claim 9 to activate said peroxide to induce cross-linking to form a thermoset polyurethane.

15. A cross-linked polyurethane obtained by heating the peroxide containing polyurethane of claim 10 to activate said peroxide to induce cross-linking to form a thermoset polyurethane.

* * * * *